July 25, 1967 J. ANDERSON 3,333,119
ATTENUATION OF HIGH FREQUENCIES IN COMMERCIAL FREQUENCY POWER TRANSMISSION LINES
Original Filed Sept. 18, 1963 3 Sheets-Sheet 1

Inventor,
John G. Anderson,
by Gilbert P. Tarleton
His Attorney.

Inventor,
John G. Anderson,
by Gilbert P. Tarleton
His Attorney.

Inventor,
John G. Anderson,
by Gilbert P. Tarleton
His Attorney.

3,333,119
Patented July 25, 1967

3,333,119

ATTENUATION OF HIGH FREQUENCIES IN COMMERCIAL FREQUENCY POWER TRANSMISSION LINES

John G. Anderson, 27 Orchard Road, Dalton, Mass. 01226

Continuation of application Ser. No. 309,786, Sept. 18, 1963. This application June 21, 1966, Ser. No. 559,337
6 Claims. (Cl. 307—89)

Figure 1:
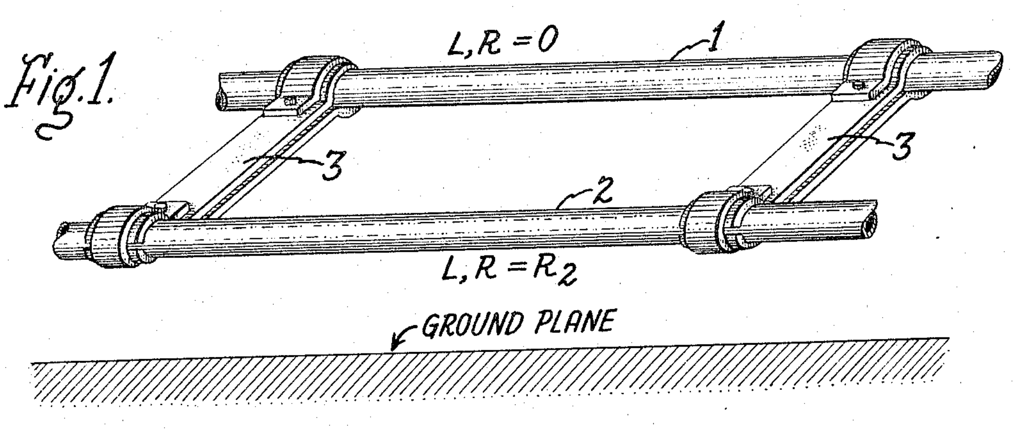

This application is a continuation of application Ser. No. 309,786, filed Sept. 18, 1963, now abandoned.

This invention relates to electric power transmission and more particularly to improvements in commercial frequency electric power transmission lines.

Conventional lines of this type transmit power at frequencies, typically 60 cycles per second, which are too low for effective electromagnetic radiation. However, they also transmit incidental high frequency currents resulting for example from corona or creepage discharge on insulator surfaces as well as steep wave front transients resulting, for example, from lightning strokes or switching surges. These high frequencies are in the so-called radio frequency range and they cause objectional radio influence or interference, or in the case of steep wave front transients, cause severe overvoltages in electrical equipment at the line terminals.

In accordance with this invention, there is provided a line, or line section, having two electrically parallel conducting paths of substantially equal inductance and substantially unequal resistance. At normal or fundamental power transmitting frequency inductive reactance is low and current division between the paths is determined almost entirely by resistance. At high frequency, inductive reactance is high and current division is determined largely by inductance. As a consequence, practically all the low frequency power current is conducted by the low resistance path with no increase in line resistance loss due to the presence of the high resistance path and upward of half the high frequency current is conducted by the high resistance path so that substantial attenuation or dissipation of the total high frequency current is achieved.

An object of the invention is to provide a new and improved high-voltage transmission line.

Another object of the invention is to provide a high-voltage transmission line which attenuates transient in the high or radio frequency range while operating as a normal line at commercial power frequencies.

A further object of the invention is to provide various conductor arrangements for use in high-voltage commercial frequency transmission lines to inherently suppress radio interference-producing radiation by the line.

The invention will be better understood from the following description taken in connection with the accompanying drawings and its scope will be pointed out in the appended claims.

Figure 2:
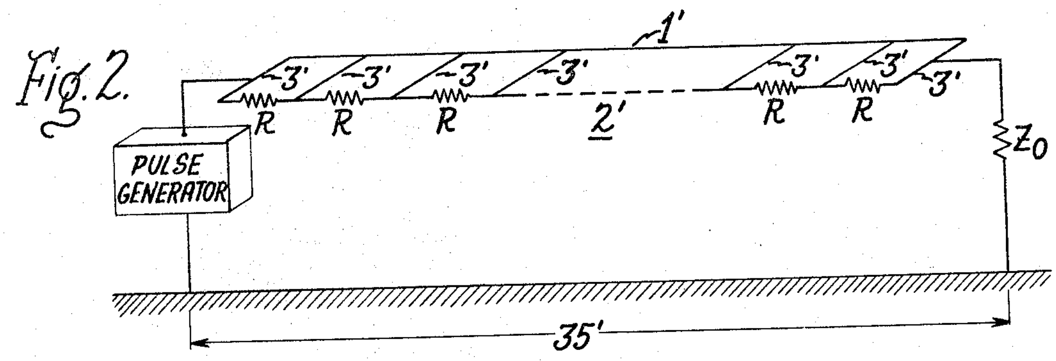
Figure 3:
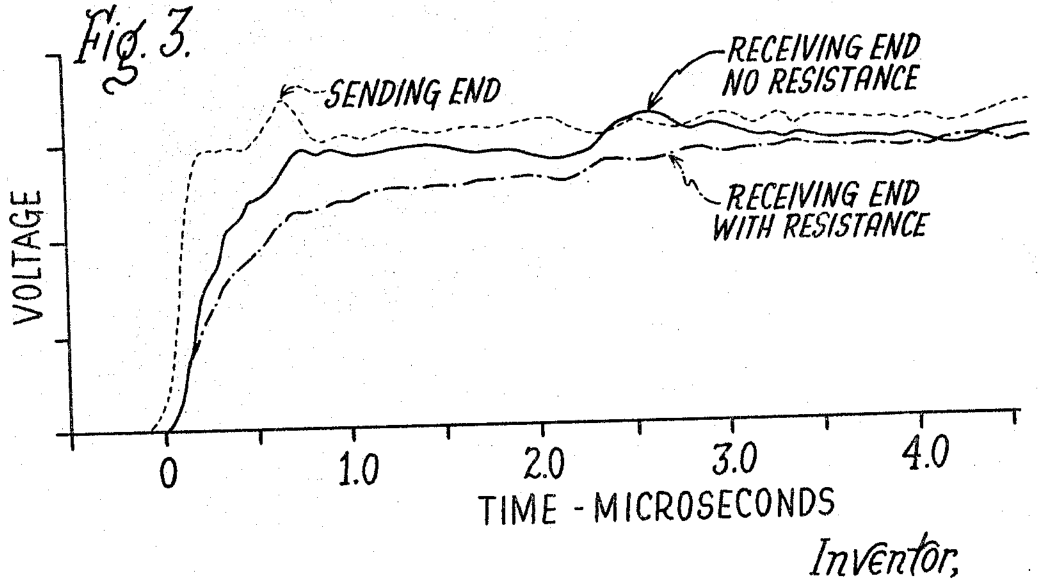
Figure 4:
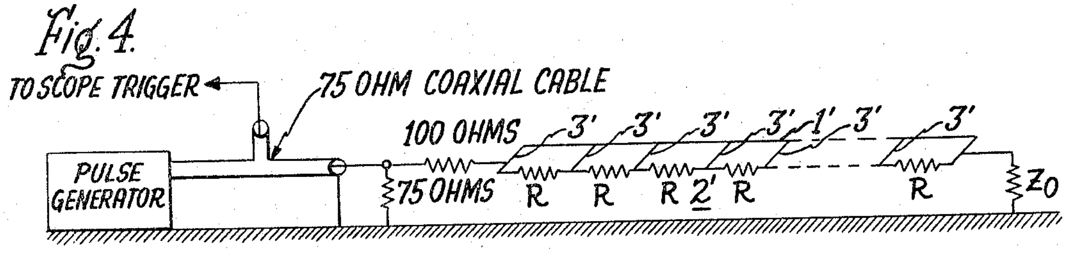

In the drawings,

FIG. 1 is a representation of a line section in accordance with the invention,

FIG. 2 is a diagrammatic representation of a model line for testing the principle of operation of the invention, FIG. 3 are oscillograph recordings of tests made on the model line shown in FIG. 2, FIG. 4 is a diagrammatic representation of a further test setup, FIG. 5 are oscillograms of the results of tests on the setup shown in FIG. 4, and FIGS. 6, 7, 8 and 9 show various modified line constructions employing the invention.

Referring now to FIG. 1, there is shown therein a pair of elongated parallel line conductors 1 and 2 separated at more or less regularly spaced intervals by electrically conducting spacers 3 of low resistance. This assembly is suspended above a conducting ground plane preferably with the plane of the conductors 1 and 2 horizontal so that each one is equally distant from the common ground plane. Each conductor has the same inductance L, but conductor 2 has an appreciable resistance $R_2$ while conductor 1 has negligible resistance assumed to be zero. If resistance $R_2$ is not too high, then at high frequencies the current traveling along the line divides between conductors 1 and 2 largely according to their inductance, thus forcing an appreciable current to flow through conductor 2 where resistance loss can occur. However, at low frequencies the current division is controlled primarily by the resistances so that practically all the current flows through conductor 1 where negligible losses occur. It should be understood that the inductance L of each conductor is total inductance per unit length, i.e. the self inductance, if the spacing between the conductors were infinite, plus the mutual inductance between the conductors resulting from the fact that their actual spacing is close enough to provide mutual coupling.

Calculations based on lumped circuit theory may be utilized to determine that value of $R_2$ per unit length which will produce maximum attenuation of current at any predetermined high frequency. To determine such an optimum value of $R_2$ for a parallel circuit section of unit length, the equivalent series resistance of the unit section may be called $R_{eq}$. It is then found by differentiation with respect to $R_2$ that the maximum value of $R_{eq}$ (i.e., maximum attenuation) occurs when $R_2=2\omega L$, where L is total inductance per unit length and $\omega$ is angular frequency in radians per second (i.e., $2\pi f$ in cycles per second). Further calculation indicates that at such optimum per unit length value of $R_2$ the equivalent series resistance per unit length, $R_{eq}$, is equal to $\omega L/4$.

Considering a specific numerical example in which the diameter of the conductors 1 and 2 is 1.6 inches, their spacing is 18 inches and their height above ground is 30 feet, then L for a 100-foot-long section is about 24.8 microhenrys and at a frequency to be attenuated of 500 kilocycles per second $R_2$ is 156 ohms or 1.56 ohms per foot for the high resistance conductor. The equivalent resistance of the line comprising the two conductors is then $R_{eq}=.195$ ohm per foot or 195 ohms in a 1000-foot span line. This would produce a voltage attenuation for 1000 feet of 0.673 and a decibel attenuation of about 3.42 decibels per 1000 feet or about 18 decibels per mile. The equivalent resistance $R_{eq}$ at 60 cycles of such a line is $56\times10^{-8}$ ohms per foot. In 100 feet, if the line is carrying 1000 amperes, this will produce a loss of 0.56 watt or about 30 watts per mile which is practically negligible.

For a resistance of 1.56 ohms per foot, the resistivity of the 1.6 inch diameter conductor 2 would be 0.665 ohm-centimeter. This is a very high resistivity—several orders of magnitude higher than graphite or Nichrome wire so that conductor 2 should preferably be a composite non-metallic element such as a tube or rod of insulating material such as synthetic rubber, butadiene or polyethylene filled or loaded with a high resistance material such as carbon black, or alternatively such high-resistance semiconducting material could be applied to the outer surface of the insulating tube or core as a paint held on by a suitable hardenable liquid vehicle.

As the inductive reactance at any frequency of either conductor 1 or 2 is equal to $\omega$L, it will be seen that the optimum value of $R_2$ for attenuating any particular frequency is twice the inductive reactance of either conductor at that frequency.

The principle of the invention was tested on a one-thirtieth scale model in which the line was strung about one foot above an aluminum ground plane, the main conductor was twenty mil hard drawn copper wire, and the high resistance conductor was in ten sections, each having a lumped resistor R of 100 ohms. This test setup is shown in FIG. 2. A pulse generator was connected to one end of the line and the other end connected to an impedance $Z_0$ which was adjusted for no reflection. After being set $Z_0$ was never disturbed since it represented either a fixed termination or a further length of lossless transmission line. The impulse generator was similar to a lightning simulating surge generator. Thus, the twenty mil main conductor corresponds to conductor 1 in FIG. 1 and the serially connected resistors R in FIG. 2, which are connected to the main conductor at their junctions, represent the high resistance conductor 2 of FIG. 1.

FIG. 3 shows full time-scale oscillograms of the receiving end voltage across $Z_0$ for a particular input voltage surge produced by the pulse generator. The "no resistance" wave is the receiving end wave with all the 100-ohm resistors shorted out, and the "with resistance" wave has the resistors inserted. As shown in FIG. 3, it will be noted that the low-frequency response represented by the deflections out on the tail at 4 or 5 microseconds is essentially the same with or without resistance, but that the resistance causes a drastic reduction in front amplitudes and rise times. There is some improvement without any additional resistance, due probably to skin effect and the natural resistance of the fine copper wire. A similar test using only a single copper conductor had very similar characteristics to the two-conductor bundle without resistance, demonstrating that it is the insertion of the additional resistance that reduces the wave severity. Shorting out part of the resistors gave output waves intermediate between those with full resistance and no resistance.

A further test was made using a nanosecond pulser feeding the circuit as shown in FIG. 4. This generated a short, sharp pulse simulating a front-of-wave flashover at the sending end of the span.

Figure 5A:
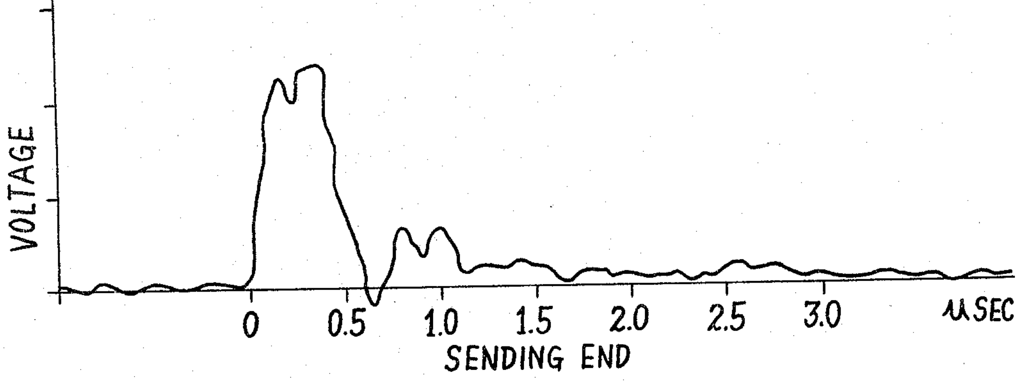
Figure 5B:
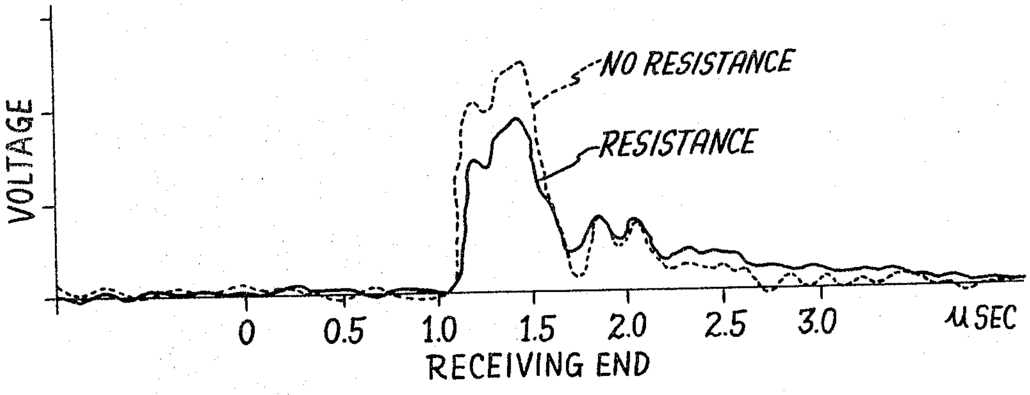

The sending and receiving end pulses with and without resistance are plotted in FIG. 5, FIG. 5A being the sending-end voltage wave and FIG. 5B being the receiving-end voltage waves, with the resistors in the circuit as shown in FIG. 4, and with time shorted out. It can be seen that the resistors tend to cause about a 20% reduction in crest voltage for a one-span traveling distance.

Figure 6:
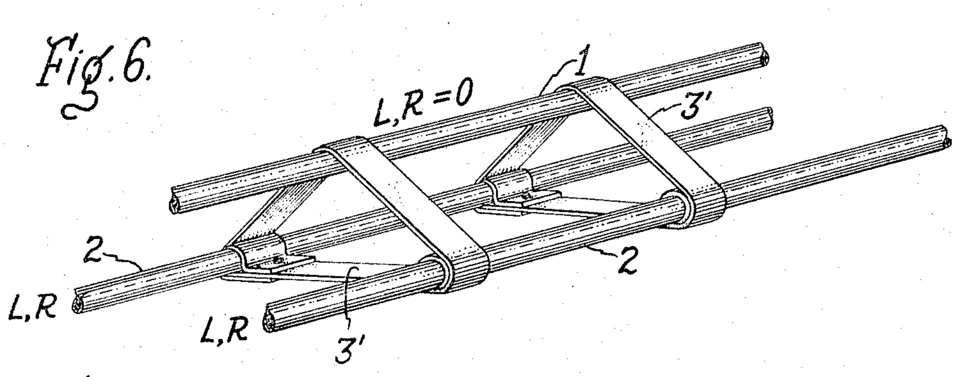

FIG. 6 shows a modification in which two conductors 2 are suspended below the main current-carrying conductor 1, these conductors being interconnected by spacers 3' of triangular shape. Here the upper conductor carries the power while the lower conductors have distributed resistance and serve as attenuators. The effective high-frequency resistance can be increased about 33% over the two-conductor case as illustrated in FIG. 1 according to rough calculations.

Figure 7:
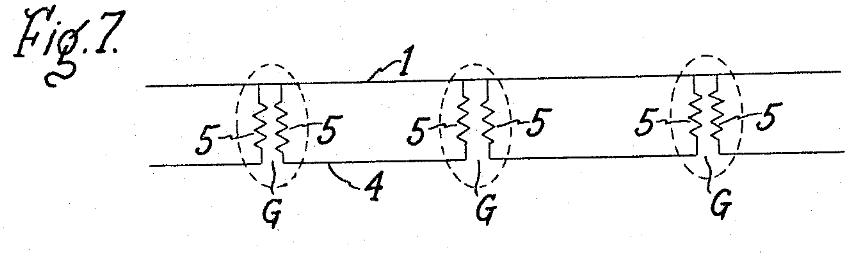

In the modification shown in FIG. 7, the high resistance required in the attenuating conductor which parallels the line conductor 1 is placed in the connecting spacers, so that the attenuating conductor may be of low resistance between the spacers. Thus conductor 1 is the main current-carrying conductors as in FIGS. 1 and 6, and an additional conductor 4, which can be similar to conductor 1, is cut to provide gaps G and connected periodically or at spaced intervals to the main conductor 1 by high resistance spacers 5.

Figure 8:
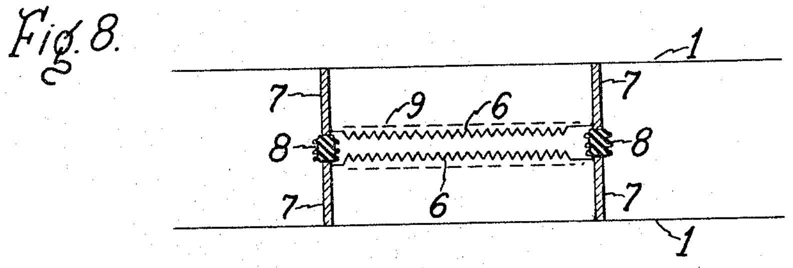

In the modification shown in FIG. 8, a standard two-conductor bundle comprising two conductors 1 carry the 60-cycle power and added resistance wire pairs 6 are connected to insulated spacers consisting of conducting metal members 7 separated by insulators 8. The resistance wire pairs 6 are preferably electrostatically shielded by an enveloping semi-conducting tube 9. It will, of course, be understood that FIG. 8 shows only one section and that the line will consist of repetitions of the section shown in FIG. 8.

Figure 9:
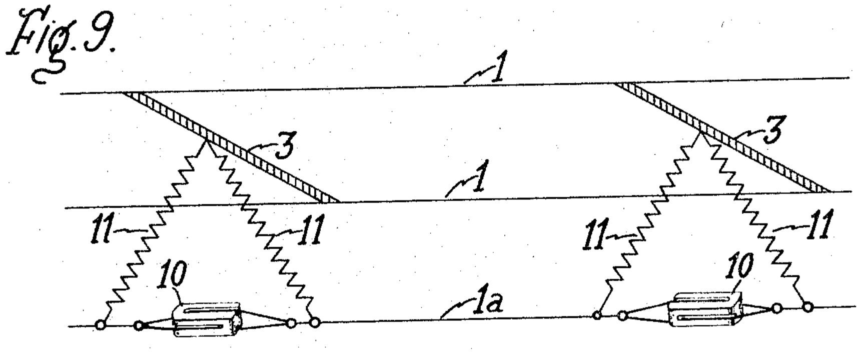

A further modification is shown in FIG. 9 as comprising a normal two-conductor bundle of two standard low resistance conductors 1 separated by standard metal spacers 3, below which is suspended from the center of the spacers 3 another standard low resistance conductor **1*a* broken by strain insulators 10 into sections, the ends of which are connected to the metal spacers 3 by resistance spacers 11. As in the other figures, under normal low-frequency conditions all the current will be conducted by the main standard conductors, but under high-frequency conditions the inductance effects will be such as to force substantial amounts of the high-frequency currents through the resistors 11**.

The arrangement of FIG. 9 has the nice advantage that in or near critical radio noise areas, it is simply necessary to add a third conductor to both reduce the radio influence generation in the critical area and to attenuate incoming conducted radio influence from distant areas.

As indicated in the preceding paragraph, it is not necessary in practicing this invention to have the entire length of the line constructed as shown in the various figures, but only selected portions of the line running near inhabited areas or power stations can have the high-resistance conductor or conductors added, but only for as many sections as desired, so as to reduce radio influence in these local areas.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new, and desire to secure by Letters Patent of the United States is:

1. An electric power transmission line comprising a first linear electric conductor of low resistance having a substantially uniformly distributed inductance of normal transmission line magnitude per unit length, said inductance providing a low inductive reactance to current at commercial power frequencies and an appreciably higher inductive reactance to high frequency currents in the radio frequency range, a second linear electric conductor of relatively high resistance connected in parallel circuit relation with at least a portion of said first conductor and disposed in substantially parallel laterally spaced apart physical relation with said first conductor, said second conductor having a substantially uniformly distributed inductance per unit length substantially equal to that of said first conductor and having a resistance of the order of twice the inductive reactance at a characteristic radio frequency of that portion of said first conductor with which the second conductor is physically and electrically paralleled, said first and second conductors dividing power frequency currents substantially inversely in proportion to their unequal resistances and dividing high frequency currents substantially equally between them thereby materially to attenuate said high frequency currents by resistance loss in said second conductor.

2. A transmission line as defined in claim 1 which includes also a third conductor having a high resistance characteristic substantially the same as that of said second conductor and in which the three conductors are physically disposed in transversely triangular parallel spaced-apart relation with conductive spacers therebetween at a plurality of longitudinally spaced-apart locations.

3. An electric power transmission line comprising a continuous linear electric conductor of low resistance having a substantially uniformly distributed inductance of normal transmission line magnitude per unit length, said inductance providing a low inductive reactance to currents at commercial power frequencies and an appreciably higher inductive reactance to high frequency currents in the radio frequency range, a discontinuous sectionalized electric conductor comprising a plurality of longitudinally spaced-apart linear sections each in substantially parallel spaced relation with respect to said continuous conductor, and high resistance means connecting each end of each section of said discontinuous conductor to said continuous conductor.

4. An electric power transmission line comprising a continuous linear electric conductor of low resistance having a substantially uniformly distributed inductance of normal transmission line magnitude per unit length, said inductance providing a low inductive reactance to currents at commercial power frequencies and an appreciably higher inductive reactance to high frequency currents in the radio frequency range, a discontinuous sectionalized electric conductor comprising a plurality of longitudinally spaced-apart linear sections of high resistance each connected in parallel circuit relation with adjacent portions of said continuous conductor and disposed in substantially parallel physical relationship with said continuous conductor, said high resistance conductor sections each having a substantially uniformly distributed inductance per unit length substantially equal to that of said continuous conductor, each said high resistance conductor section and the parallel portion of said continuous conductor dividing power frequency currents substantially inversely in proportion to their unequal resistances per unit length and dividing high frequency currents substantially equally thereby to attenuate high frequency currents to a greater degree than power frequency currents.

5. In a commercial frequency power transmission line, a pair of continuous phase conductors positioned in parallel spaced relation and connected in parallel circuit relation, each said conductor having substantially the same normal resistance and reactance characteristics, transverse spacers connected between said conductors at a plurality of adjacent points of substantially equal potential, each said spacer having conductive end portions separated by a non-conductive center section, and a pair of high resistance wires connected between each adjacent pair of said spacers on like sides of said non-conductive center sections thereby to form a high resistance line in parallel circuit relation with at least a portion of each said phase conductor of normal characteristics.

6. A line as defined in claim 5 in which electrostatic shielding means surrounds said resistance wires.

References Cited

UNITED STATES PATENTS

| | | | |
|---|---|---|---|
| 1,612,353 | 12/1926 | Brace | 191—41 |
| 1,643,209 | 9/1927 | Griffith | 191—41 |
| 2,404,088 | 6/1946 | Pinkerton | 191—40 |
| 2,518,225 | 8/1950 | Dorst | 333—23 X |

MILTON O. HIRSHFIELD, *Primary Examiner.*

J. J. SWARTZ, J. W. GIBBS, *Assistant Examiners.*